United States Patent [19]

Simuni

[11] Patent Number: 5,222,689
[45] Date of Patent: Jun. 29, 1993

[54] AIRCRAFT HAVING MAGNETIC SUSPENSION SYSTEMS

[76] Inventor: Leonid Simuni, 1056 Neilson St. Apt. 6A, Far Rockaway, N.Y. 11691

[21] Appl. No.: 688,818

[22] Filed: Apr. 22, 1991

[51] Int. Cl.⁵ ............................................. A63G 1/00
[52] U.S. Cl. .................................. 244/1 R; 104/23.1; 104/281; 244/110 A; 505/904
[58] Field of Search ................... 244/50, 66, 1 R, 166, 244/110 R, 110 A; 104/281, 283, 284, 23.1; 505/902, 903, 904

[56] References Cited

U.S. PATENT DOCUMENTS

| | | | |
|---|---|---|---|
| 1,415,190 | 5/1922 | Palmer | 104/23.1 |
| 2,954,943 | 10/1960 | De Lagabbe | 244/66 |
| 3,855,939 | 12/1974 | Woitsch | 104/281 |
| 3,892,185 | 7/1975 | Guderjahn | 104/281 |
| 3,919,944 | 11/1975 | Jorg | 104/23.1 |
| 4,941,406 | 7/1990 | Lay | 104/23.1 |
| 4,979,445 | 12/1990 | Lanzara | 505/902 |

FOREIGN PATENT DOCUMENTS

| | | | |
|---|---|---|---|
| 0377893 | 6/1923 | Fed. Rep. of Germany | 104/23.1 |
| 0526375 | 10/1921 | France | 104/23.1 |
| 1014782 | 4/1983 | U.S.S.R. | 104/23.1 |

OTHER PUBLICATIONS

Bruce Schecter "Flux Creep" Oct. 1989 Discover Magazine p. 20.

*Primary Examiner*—Joseph F. Peters, Jr.
*Assistant Examiner*—Christopher P. Ellis

[57] ABSTRACT

An aircraft having magnetic suspension systems adapted to be used as a winged surface effect aircraft, as a conventional type aircraft and as an aircraft of vertical take-off. A winged surface effect aircraft is provided with a magnetic suspension system having electromagnets adapted for magnetic interaction with a composite run-way utilizing an eddy current to support the rear portion of winged surface effect aircraft laterally in relation to the run-way while the front portion is supported by and rides on an air cushion developed by forward thrust between the wing and ground. The propelling units of the surface effect aircraft are adapted to hover the front portion and to propel the aircraft along the run-way while the rear portion of aircraft is magnetically supported by the magnetic suspension system. The winged surface effect aircraft can be adapted to be propelled over the ground surface as a conventional type aircraft when the electromagnets are disengaged. The magnetic suspension system of a conventional type aircraft is adapted to provide braking forces to reduce the speed of the conventional type aircraft after landing. An aircraft of vertical take-off is provided with magnetic systems to support the aircraft in the vertical position and to boost the vertical take-off by eddy current repulsion. Propelling units of the winged surface effect aircraft, the conventional type aircraft and of the aircraft of vertical take-off are adapted to reduce the consumption of fuel.

6 Claims, 2 Drawing Sheets

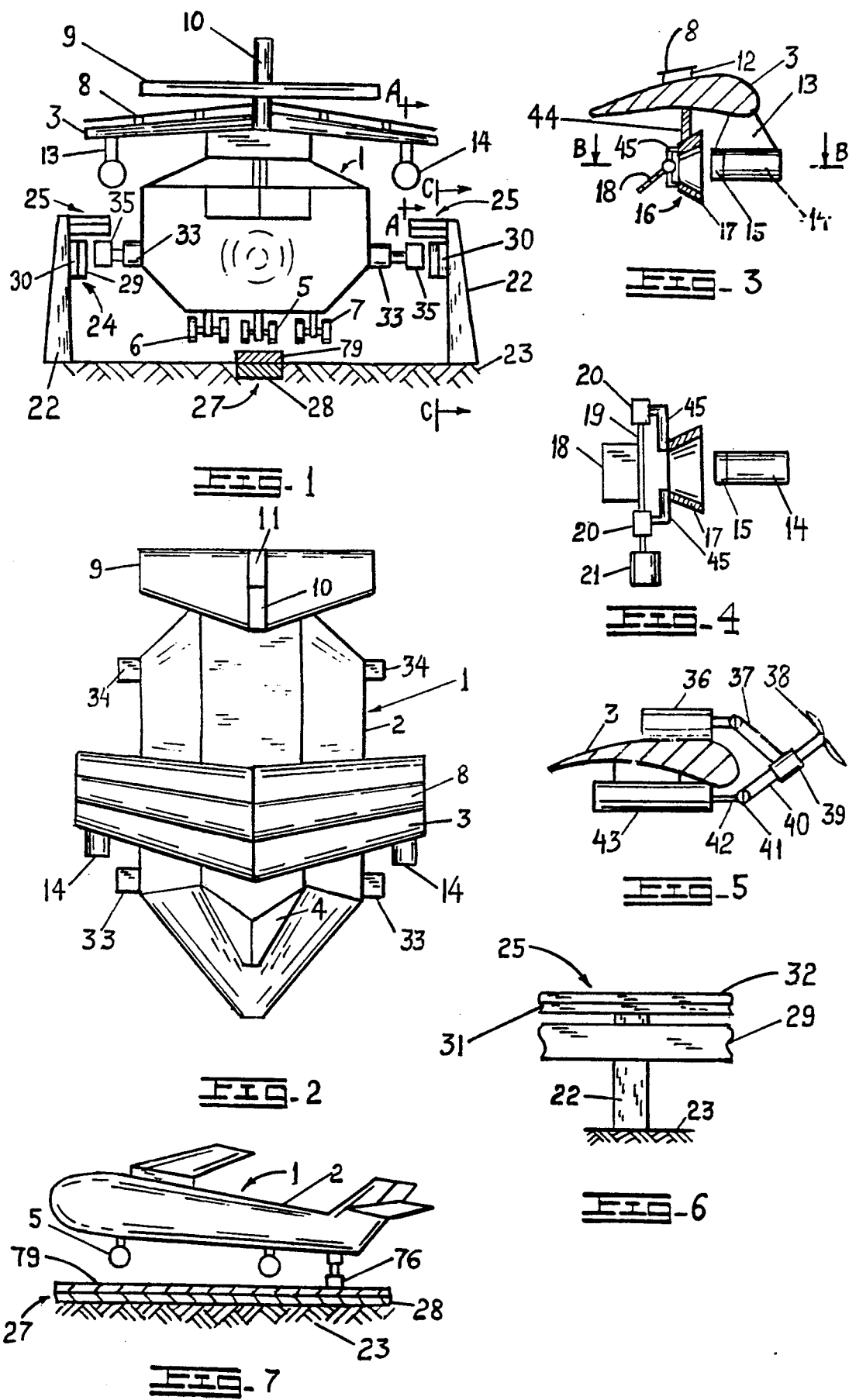

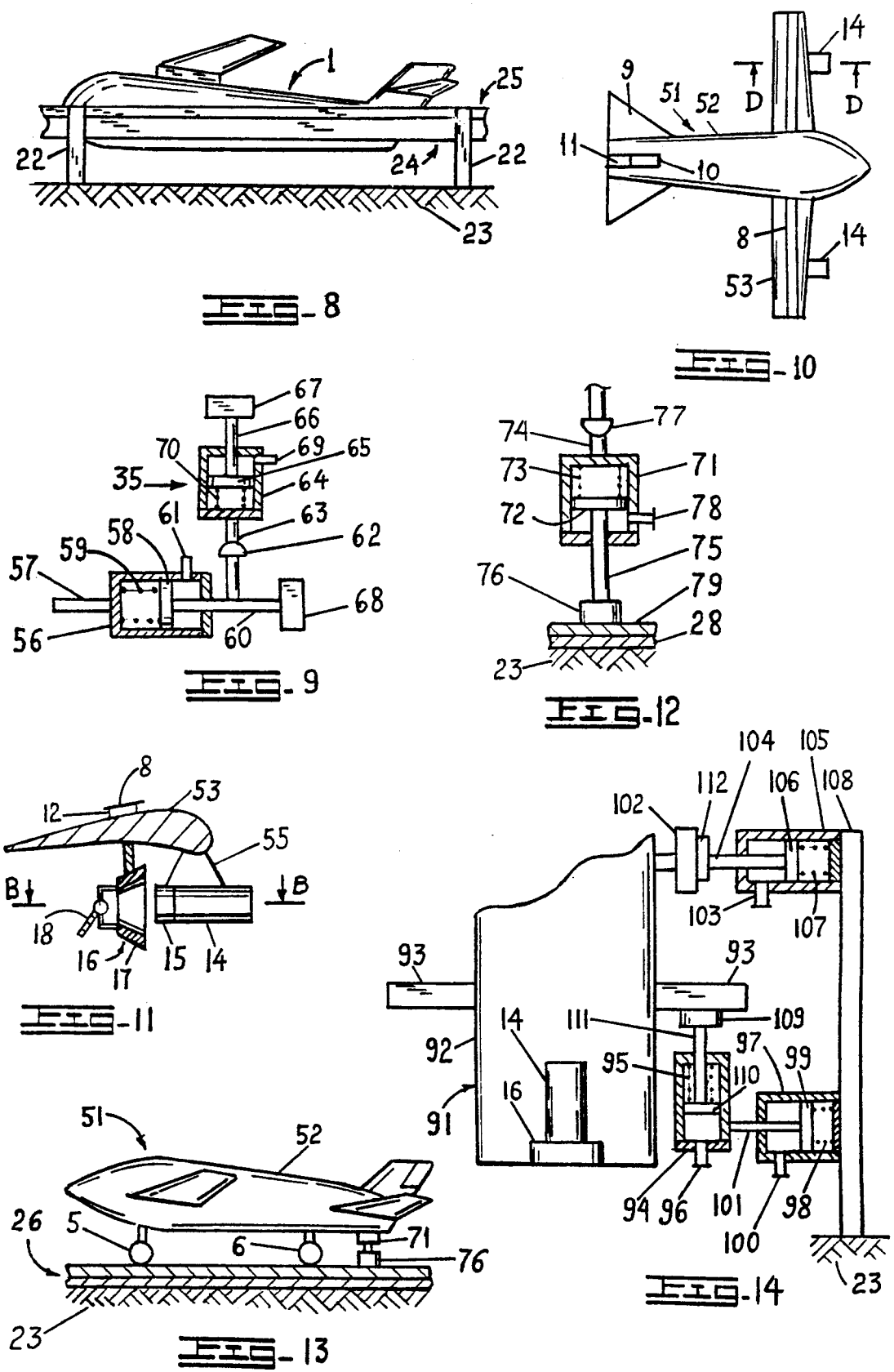

AIRCRAFT HAVING MAGNETIC SUSPENSION SYSTEMS

1. FIELD OF THE INVENTION

The present invention relates to aircraft having magnetic suspension systems (MSS) including a surface effect aircraft (SEA), a conventional type aircraft (CTA) and an aircraft of vertical take-off (AVTO).

2. Prior Art

Attempts have been made in the past to employ the MSS for a vehicle that is propelled by a motor along a rail wherein wings provide lift during operation and magnets provide levitation as in U.S. Pat. No. 4,941,406. However, this vehicle is not adapted to provide the take-off from the rails.

SUMMARY OF THE INVENTION

Accordingly, it is the main object of this invention to provide a SEA having a MSS.

It is another object of the present invention to provide a CTA having a MSS to reduce the speed of CTA after landing.

It is further object of this invention to provide an AVTO having an MSS to boost the vertical take-off.

The novel features of the present invention are set in particular in the appended claims. The invention itself, however, both as to its construction and its manner of operation will be best understood from the following description of a preferred embodiment which is accompanied by the following drawings illustrating the invention.

BRIEF DESCRIPTION OF THE DRAWINGS

FIG. 1 is a front view of a SEA;
FIG. 2 is a plan view of a SEA;
FIG. 3 is a section taken along the line A—A of FIG. 1;
FIG. 4 is a section taken along the line B—B of FIG. 3 and FIG. 11;
FIG. 5 is a scheme of remote control of engine driving a propeller;
FIG. 6 is a section taken along the line C—C of FIG. 1;
FIG. 7 is a side view of the SEA having rear magnetic suspension systems;
FIG. 8 is a side view of the SEA in a guide-way;
FIG. 9 is a side view of a guided block of the SEA;
FIG. 10 is plan view of a CTA;
FIG. 11 is a section taken along the line D—D of FIG. 10;
FIG. 12 is a cross-section of the MSS;
FIG. 13 is a side view of a CTA having a MSS;
FIG. 14 is a partial side view of an AVTO.

DESCRIPTION OF A PREFERRED EMBODIMENT

Proceeding now to the detailed description of the drawings, the figures illustrate SEA1, CTA51, AVTO 91. A SEA comprises a wing 3, a body 2, a cabin 4, front wheels 5, rear wheels 6 and 7, rigid flaps 8, a horizontal stabilizer 9, a vortical stabilizer 10, and a rudder 11. Flaps 8 are fixedly mounted above both sides of the wing 3 by means of the bars 12. Flaps 8 are arranged along the wing 3 in order to increase the speed of air flowing over the wing and to increase the lifting forces of the wing. Each propelling unit 14 is fixed to the wing 3 by bar 13. The propelling unit 14 comprises an outlet 15 for ejecting gases. A nozzle 16 is fixed to the wing 3 by bar 44. A nozzle 16 is formed by a conical guide 17 surrounding the outlet 15 of a turbo-jet engine of propelling unit 14. A propelling unit comprises also the damper 18 having a remote control comprising a servo-motor 21. The damper 18 is fixed to the shaft 19 having bearings 20 which are mounted to the nozzle 16 by bars 45. The servo-motor 21 may be of electrical or a hydraulic type. The wing 3 is arranged in the front portion of the SEA and extending from both sides of a cabin 4. For propulsion of the SEA, it is possible to use, for example, an aerial rotor 38 which is connected with engine 43 by drive shaft 42, a hinged joint 41 and a spindle 40. A servo-motor motor 36 provides an adjustable angle of attack of aerial rotor 38 by means of the pivoted axis 37 and movable bearing 39 (FIG. 5).

Engines 14 and nozzles 16 are adjusted so as t o introduce an outer air by ejecting gases into each nozzle 16. This design provides an increase in thrust and a decrease in the consumption of fuel. The SEA comprises electro-magnets for limiting the vertical and horizontal movement by the composite guide-way which includes horizontal planes 25 and vertical planes 24.

The present invention provides the eddy current repulsion between electromagnets or cryogenic magnets 67,68 and composite guide-way having planes 24,25. The intersection between magnets 68 and planes 24 provides for limiting the horizontal movement of the SEA. The composite plane 24 consists of a first layer 30 of nonferromagnetic material, for example, an aluminum, and second layer 29 of ferromagnetic material, for example, an iron. A magnet 68 is fixed to the piston 58 of servo-motor 56 having the remote control (not shown). The magnet 68 is attracted to the ferromagnetic layer 29 while the SEA approaches any plane 24. As distance decreases a point will be reached where layer 29 becomes saturated with flux from magnet 68.

In this case the flux enters a layer 30. This causes the formation of eddy currents in conductor 30 which in turn create a repulsive force between the conductor 30 and the magnet 68. The interaction between magnets 68 and both planes 24 will provide for limiting the horizontal movement of the SEA during high speed operation.

The interaction between magnets 67 and composite planes 25 provides for limiting the vertical movement of the SEA. The composite plane 25 consists of a first layer 32 of non-ferromagnetic material, for example, an aluminum, and second layer 31 of ferromagnetic material, for example, iron. A magnet 67 is fixed by rod 66 to piston 65 of servo-motor 64. Magnet 67 is attracted to ferromagnetic layer 31 in the case of movement of the SEA to any plane 25. As distance decreases a point will be reached where layer 31 becomes saturated with flux from magnet 67. In this case a flux enters layer 32. This causes the formation of eddy currents in the conductor 32 which in turn create a repulsive force between the conductor 32 and the magnet 67 for limiting the vertical movement of the SEA. Composite planes 24,25 are fixed to the guide-way members 22 which are made of a conventional building material such as concrete. Pistons 58,65 are slidably mounted in the servo-motors 56,64 having inlets 61,69 for introducing the fluid or compressed air. It is possible to employ the electrical servo-systems. Springs 59,70 are adjusted to keep magnets 67,68 close by composite planes 25,24. A servo-motor 64 is fixed to the spindle 60 by the rod 63 and a hinged joint 62.

The spindle 60 connects the piston 58 and magnet 68. The guided blocks 35 comprise servomotors 56,64 fixed to the guides 33,34 of SEA 1 by the bars 57. Electrical diagrams of electromagnets or cryogenic magnets 67,68 are not shown. A magnetic suspension system (MSS) of the SEA 1 is adapted for interaction with the composite run-way 27. A MSS of CTA 51 is adapted for interaction with the composite run-way 26 of an airport. A MSS comprises a servo-motor 71 having a piston 72, a spring 73, an inlet 78 for introducing fluid or compressed air. A piston 72 is connected with an electromagnet or cryogenic magnet 76 by the rod 75. The spring 73 is adjusted to keep a magnet 76 close by the composite plane 26 or 27 which consists of a first layer 28 of nonferromagnetic conductor material, for example, an aluminum and a second layer 79 of ferromagnetic material, for example, an iron. The composite planes 26 and 27 are adjusted to the foundation 23 of the run-way. The electrical diagram of magnet 76 is not shown. The servo-motor 71 is mounted to the rear bottom portion of body 2 or 52 by means of the bar 74 and hinge 77. The front portion of the SEA 1 is lifted by the wing 3 and propelling units 14 during movement over the run-way 26 or 27 while the rear portion of the SEA 1 is supported by magnetic interaction between the electromagnet 76 and the composite run-way. This arrangement provides speeds up to 300-400 mph.

It is possible to provide modifications of SEA 1:
having guided blocks 35 and electromagnets 76 (FIG. 1);
having guided blocks 35 (FIG. 8);
having electromagnets 76 (FIG. 7); A MSS having electromagnet 76 is employed both as a guided block and/or for providing the additional braking action during approach to the station.

The SEA 1 is adapted to be propelled over the ground surface without being supported by magnetic interaction between electromagnet 76 and the run-way. Propulsion is provided by propelling units 14. Lift is provided by the wing 3 and propelling units 14 having adjustable direction of thrust. A SEA 1 is supported by and rides on an air cushion developed on forward thrust between the wing 3 and ground.

The SEA 1 is adapted to be propelled over a composite run-way 26 or 27. Electromagnets 76 are adapted for engagement with run-way 26 or 27 for holding a SEA 1 laterally in relation to run-way while SEA 1 is supported by and rides an air cushion developed on forward thrust between the wing and ground. A SEA 1 is stabilized vertically in its air cushion ride by being magnetically held in relation to run-way 26 or 27.

The SEA 1 is adapted to be propelled along the guide-way having planes 24 and 25 arranged, for example, in a subway. A guide-way for SEA (FIG. 8) also may be arranged along the highway, along the sea coast, across the country-side etc. Maneuvers of the SEA 1 are provided by propulsion units 14 and remotely controlled dampers 18.

A conventional type aircraft (CTA) 51 comprises a wing 53, a body 52, front wheels 5, rear wheels 6, a horizontal stabilizer 9, a vertical stabilizer 10, flaps 8, a rudder 11 and propelling units 14. Each propelling unit comprises a nozzle 16 and the damper 18 having a servo-motor 21 (FIG. 4). The propelling unit 14 includes a turbo-jet engine fixed to the wing 53 by the bar 55. The nozzle 16 is fixed to the wing 53 by bar 54. The nozzle 16 is formed by a conical guide 17 surrounding the outlet 15 of the turbo-jet engine of propulsion unit 14. The nozzle 16 is adjusted so as to introduce an outer air by ejecting gases of the turbo-jet engine to increase the thrust and to reduce the consumption of the fuel.

The damper 18 is adapted to deflect gases ejecting through the nozzle 16 to provide the control and direction of the thrust. A MSS for use with CTA 51 provides reducing the speed of CTA51 after landing by use of eddy current repulsion between the electromagnet 76 and composite run-way 26 of the airport (FIG. 13).

An AVTO 91 comprises a body 92, propelling units 14 having nozzles 16, a MSS and a magnetic system for limiting the horizontal movement of the AVTO during a take-off. The AVTO may be provided with additional electro-jet engines (Ser. No. 07/636,092;- filing date Dec. 31, 1990) to increase the efficiency of the power plant of the AVTO in conditions of weightlessness. A MSS adapted to support an AVTO in the start position, to boost during the take-off and to reduce the consumption of the fuel during the take-off by the eddy current repulsion between electromagnets 109 and nonferromagnetic horizontal guides (NHG) 93 fixed to the body 92. Servomotors 94,97,105 located outside of AVTO are adapted to support the AVTO and provide the take-off. Servomotors 94,97,105 comprise pistons 110,99,106, springs 95,98,107 and inlets for introducing the fluid or compressed air 96,100, 103 respectively. A piston 99 is connected with servomotor 94 by the rod 101 to remove the servomotor 94 from NHG 93. An AVTO comprises nonferromagnetic, vertical guides (NVG) 102 for limiting the horizontal movement of the AVTO during the take-off in combination with electromagnets or cryogenic magnets 112 by providing an eddy current repulsion. The NVG and NHG 102,93 are fixedly mounted in the top and bottom portion of the AVTO respectively, symmetrically with respect to the body 92, from opposite sides of body 92. The remote control (not shown) provides feeding electromagnets or cryogenic magnets 109,112. An interaction between magnets 109,112 and NHG 93, NVG 102 is provided by eddy current repulsion. In the start position electromagnets 109,112 are disengaged. The electromagnet 109 is connected with the piston 110 by the rod 111 to provide the movement of electromagnet 109 towards the NHG 93. The piston 106 is connected with electromagnet 112 by the rod 104 both to support the AVTO and to remove the electromagnet from the NVG 102. Servomotors 105,97 are fixed to the supports 108 which are made of conventional building material such as concrete. Cooling systems of servomotors are not shown. The MBS provides both a safety take-off and reduces the consumption of the fuel during the take-off because the MBS produces additional repulsive forces.

The control rooms having control panels of SEA, CTA and AVTO are not shown. The above operations of the aircraft having magnetic suspension systems are summarized as follows:
a SEA 1 is propelled over the ground. Electromagnet 76 is disengaged from interaction with run-way.
a SEA 1 is propelled over the run-way 27. A SEA 1 is supported by and rides on an air cushion developed on forward thrust between the wing 3 and run-way.

An electromagnet 76 is engaged for interaction with the run-way to support the rear portion of SEA 1 laterally in relation to the run-way.
an electromagnet 76 is engaged to provide an additional braking action of SEA 1.

an electromagnet 76 of CTA 51 is engaged to reduce the speed of CTA 51 after landing by braking action.

Magnetic systems of AVTA 91 are operated to support an AVTO in the vertical position and to boost the vertical take-off by eddy current repulsion. Moreover, having thus described the invention, it should be apparent that numerous structural modifications are contemplated as being part of this invention as set forth hereinabove and as defined hereinbelow by the claims.

What is claimed is:

1. An aircraft comprising: front and rear wheels, a body having a front portion, a rear portion, a bottom portion, a wing fixedly mounted on said body, propelling units arranged symmetrically with respect to said body; and a magnetic suspension system having electromagnets, said electromagnets being arranged at the bottom portion of said aircraft, said electromagnets are adapted for magnetic interaction with a composite runway by means of an eddy current, said composite runway further comprises a composite guideway, said magnetic suspension system being adapted for engagement with said composite guideway thereby holding said aircraft laterally in relation to said guideway while said aircraft is supported by and rides on an air cushion between the wing and ground developed by a forward thrust, said aircraft being stabilized vertically by being magnetically held in relation to said guideway, said electromagnets are movable towards said guideway by means of a servo-motor, said aircraft is adapted to be used as a surface effect aircraft wherein said magnetic suspension system reacts with the composite guideway to limit said aircraft from movement in the lateral and upward directions, and said magnetic suspension system does not provide any support, for said aircraft, against downward movement.

2. An aircraft as defined in claim 1, wherein said propelling units comprise turbo-jet engines; nozzles having remotely controlled dampers, each said turbo-jet engine and each said nozzle are adjusted so as to introduce an outer air by ejecting gases into each said nozzle, said nozzle is formed by a conical guide surrounding an outlet of said turbo-jet engine, said remotely controlled damper is adapted for deflecting gases which are ejected through said nozzle in order to provide a remote control of the direction of thrust, said propelling units and the remotely controlled dampers are adapted to hover said front portion of said aircraft relative to said runway, said propelling units are adapted to propel said aircraft along said runway while the rear portion of said aircraft is magnetically supported by said magnetic suspension system.

3. An aircraft as defined in claim 1, wherein said composite runway comprises a first layer containing a nonferromagnetic conductor, said first layer being disposed above said runway, said runway comprising a second layer containing a ferromagnetic material, said second layer being positioned intermediate said first layer and said magnetic suspension system, said first and second layers are adapted for providing magnetic attractive forces by an eddy current, said attractive forces are applied to said magnetic suspension system of said aircraft.

4. An aircraft in combination with an airport wherein said aircraft comprises: front and rear wheels, a body having a front portion, a rear portion, a bottom portion, a wing fixedly mounted on said body, propelling units arranged symmetrically with respect to said body; and a magnetic suspension system having electromagnets, said electromagnets are arranged at a rear bottom portion of said aircraft, said electromagnets are adapted for magnetic interaction with a composite runway of said airport by means of an eddy current, said electromagnets are adapted for engagement with said composite runway to provide braking forces and to reduce the speed of the aircraft after landing, said braking forces are produced by means of the eddy current, said electromagnets are movable towards said runway by means of a servo-motor, said aircraft is adapted to by used as a conventional type aircraft.

5. An aircraft as defined in claim 4 wherein said propelling units comprise turbo-jet engines; and nozzles having remotely controlled dampers, each said turbo-jet engine and each said nozzle are adjusted so as to introduce an outer air by ejecting gases into each said nozzle, said nozzle is formed by a conical guide surrounding an outlet of said turbo-jet engine, said remotely controlled damper is adapted for deflecting gases which are ejected through said nozzle in order to provide a remote control of the direction of thrust, said propelling units are adapted to propel said conventional type aircraft, said propelling units are adapted to reduce a consumption of fuel by injecting an outer air into said nozzle of each propelling unit.

6. An aircraft as defined in claim 4, wherein said composite runway of said airport comprises a first layer containing a nonferromagnetic conductor, said first layer being disposed above said runway of said airport, said runway comprises a second layer containing a ferromagnetic material, said second layer being positioned intermediate said first layer and said magnetic suspension system, said first and second layers are adapted for providing the magnetic attractive forces by an eddy current, said attractive forces are applied to said electromagnets of said magnetic suspension system of said aircraft for reducing the speed of said aircraft after landing.

* * * * *